United States Patent Office.

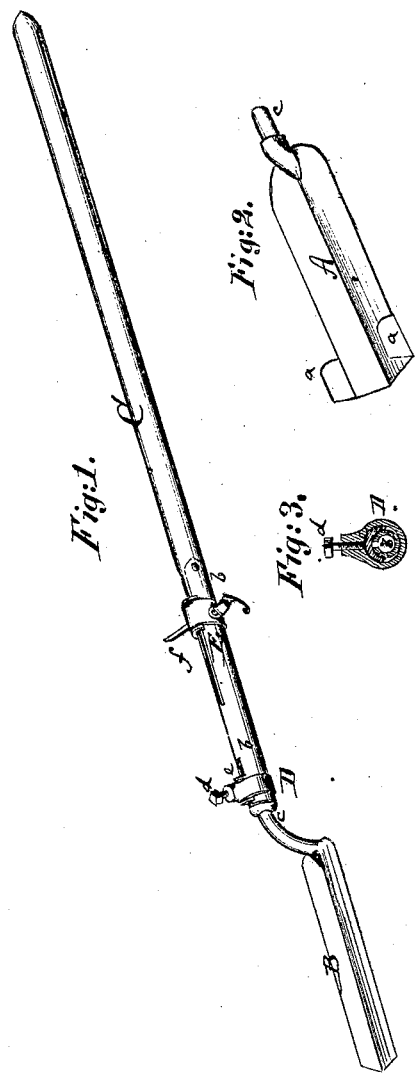
J. Gaylor,
Shovel.
No. 106,779.  Patented Aug. 30. 1870.

JACOB CAYLOR, OF HALF WAY, INDIANA.

Letters Patent No. 106,779, dated August 30, 1870.

IMPROVEMENT IN SPADES AND SHOVELS.

The Schedule referred to in these Letters Patent and making part of the same.

*To all whom it may concern:*

Be it known that I, JACOB CAYLOR, of Half Way, in the county of Jay and State of Indiana, have invented a new and useful Improvement in Spades and Shovels; and I do hereby declare that the following is a full, clear, and exact description thereof, which will enable others skilled in the art to make and use the same, reference being had to the accompanying drawing forming part of this specification, in which—

Figure 1 represents a perspective view of my improved shovel and handle.

Figure 2 is a perspective view of the spade.

Figure 3 is a detail transverse section of the fastening at the handle.

Similar letters of reference indicate corresponding parts.

This invention relates to a new manner of constructing the blade of a spade, and also to a novel method of securing spades and shovels to the handles, and to a novel construction of handle.

The invention consists, first, in forming upward-projecting ears, *a a*, on the sides of the spade-blade A, the said ears being short, but sufficiently long to cut and determine the width of the sod. The body of the blade is slightly depressed in the middle throughout its entire length, as shown.

The invention consists, also, in a novel manner of securing the spade A or shovel B to the handle C.

The handle carries at its lower end a ferrule, *b*, which projects beyond the handle, and which receives the projecting shank *c* of said spade or shovel. That part of the ferrule which receives the shank is slotted, so as to have some spring.

Around it is fitted a ring, D, which has a set-screw, *d*, and an inner curved cam-plate, *e*, as shown in fig. 3.

By means of the set-screw the ferrule can be so compressed as to firmly clamp the shank of the spade or shovel.

By means of the set-screw and ring the shovel or spade-blade can be readily removed, to allow another blade to be secured to the handle.

Having thus described my invention,

I claim as new and desire to secure by Letters Patent—

1. The arrangement of a short cutter, *a*, on each side of the sodding-spade, to incise the earth, cut the roots, and regulate the width of sod, as shown in fig. 2 of drawing.

2. The slotted ferrule *b*, ring D, screw *d*, and plate *e*, combined with each other and with the handle C, for the purpose of clamping the shank of a spade or shovel, as set forth.

JACOB CAYLOR.

Witnesses:
    THOS. J. DRAGOO,
    J. A. HENNING.